United States Patent [19]

Goguen

[11] Patent Number: 4,549,925
[45] Date of Patent: Oct. 29, 1985

[54] SPLICER PLUNGER ASSEMBLY

[75] Inventor: Louis J. Goguen, New Brunswick, Canada

[73] Assignee: King Instrument Corporation, Westboro, Mass.

[21] Appl. No.: 443,562

[22] Filed: Nov. 22, 1982

[51] Int. Cl.$^4$ .................. B31F 5/06; B65H 69/06
[52] U.S. Cl. .................... 156/506; 156/518; 156/520; 242/56 R; 384/300
[58] Field of Search .......... 156/506, 505, 518, 519, 156/520; 242/56 R; 308/908; 384/300

[56] References Cited

U.S. PATENT DOCUMENTS

| 3,472,564 | 10/1969 | Kellner | 384/300 |
| 3,677,879 | 7/1972 | D'Andrea | 308/6 R |
| 3,753,835 | 8/1973 | King | 156/506 |
| 4,060,287 | 11/1977 | Orkin | 384/203 |
| 4,179,961 | 12/1979 | Harris | 83/409 |
| 4,199,233 | 4/1980 | Scholz | 226/62 |

Primary Examiner—Michael Wityshyn
Attorney, Agent, or Firm—Schiller & Pandiscio

[57] ABSTRACT

An improved plunger assembly is provided for use in a splicing tape dispenser-applicator of the type which comprises a plunger and a guide channel in which the plunger reciprocates. The improved plunger assembly comprises a plurality of low-friction bearing devices carried by the plunger and arranged so as to slidably engage at least one member which defines the guide channel. The low-friction bearing devices reduce friction wearing of the plunger and the at least one channel-defining member.

5 Claims, 4 Drawing Figures

SPLICER PLUNGER ASSEMBLY

FIELD OF THE INVENTION

This invention relates to tape winding machines in general, and more particularly to splicing tape dispenser-applicators of the sort typically employed in tape winding machines.

BACKGROUND OF THE INVENTION

Tape winding machines are well known in the art. Such machines are used to transfer magnetic recording tape of the sort used in audio or video applications from the large supply reels typically prepared during tape manufacture onto the smaller hubs commonly employed in tape cassettes. See, for example, U.S. Pat Nos. 3,737,358, 4,061,286, 3,753,834, 3,637,153, 3,997,123 and 4,204,898. Such tape winding machines typically receive a pair of hubs connected by a leader tape, sever the leader tape into two sections, splice virgin or prerecorded magnetic tape to the leader tape section attached to a first of the hubs, wind a predetermined amount of magnetic tape onto that hub, and then splice the trailing end of the wound magnetic tape to the leader tape section attached to the second of the hubs. Machines currently exist for conducting this tape splicing and winding operation either before the hubs are mounted in a cassette or, alternatively, after the hubs have been mounted in a cassette.

Tape winding machines of the sort described above typically employ splicing tape dispenser-applicators to splice the supply and leader tapes together during the splicing operations described above. One preferred type of splicing tape dispenser-applicator now in common use, and described and illustrated in detail in U.S. Pat. No. 3,753,835, uses a reciprocating plunger assembly to cut a piece of splicing tape from a source of splicing tape and then press it against the two tapes to be spliced. The splicing tape then serves to effect the splice between the two subject tapes. The reciprocating plunger is made of metal and travels in a vertical guide channel which is defined by metal parts. A close sliding fit is required between the metal plunger and the vertical channel in order to assure that the plunger will be properly delivered to the point where the splice is to be made.

Unfortunately, over the course of repeated operation of the splicing tape dispenser-applicator, significant wearing of the various metal members occurs as a result of this metal-on-metal contact. One consequence of this wearing process is deterioration of the close sliding fit between the plunger and the guide channel. Since the close sliding fit is essential to satisfactory operation, the plunger and/or the metal members which define the vertical channel eventually have to be replaced. Such replacement tends to increase the "down-time" of the tape winding machine, thereby lowering the winding machine's productivity as well as increasing maintenance costs.

An even more important consequence of the aforementioned wearing process is that a fine metallic dust tends to build up within the vertical channel. This fine metallic dust may impede easy movement of the plunger within the vertical channel, thereby slowing operation of the splicing tape dispenser-applicator and necessitating frequent cleaning and lubrication of the plunger and the vertical channel. Such frequent cleaning and lubrication also tends to increase the "down-time" of the tape winding machine.

OBJECTS OF THE PRESENT INVENTION

Accordingly, the principal object of the present invention is to improve upon the splicing tape dispenser-applicator described and illustrated in U.S. Pat. No. 3,753,835 by solving the aforementioned wear problems associated with that dispenser-applicator's reciprocating plunger assembly.

SUMMARY OF THE INVENTION

This and other objects of the invention are achieved by providing a novel plunger assembly characterized by a plurality of low-friction bearing devices carried by the plunger. The bearing devices are disposed on the plunger so that they communicate with at least some of the metal parts which define the plunger's vertical channel, in order that the rubbing which occurs between the metal plunger and the metal parts which define the vertical channel will be significantly reduced when the plunger moves within the channel.

BRIEF DESCRIPTION OF THE DRAWINGS

Still other objects and features of the present invention are more fully disclosed or rendered obvious in the following detailed description of the preferred embodiment of the invention, which is to be considered together with the accompanying drawings wherein like numbers refer to like parts and further wherein.

DETAILED DESCRIPTION OF THE PREFERRED EMBODIMENT

Figure 1:
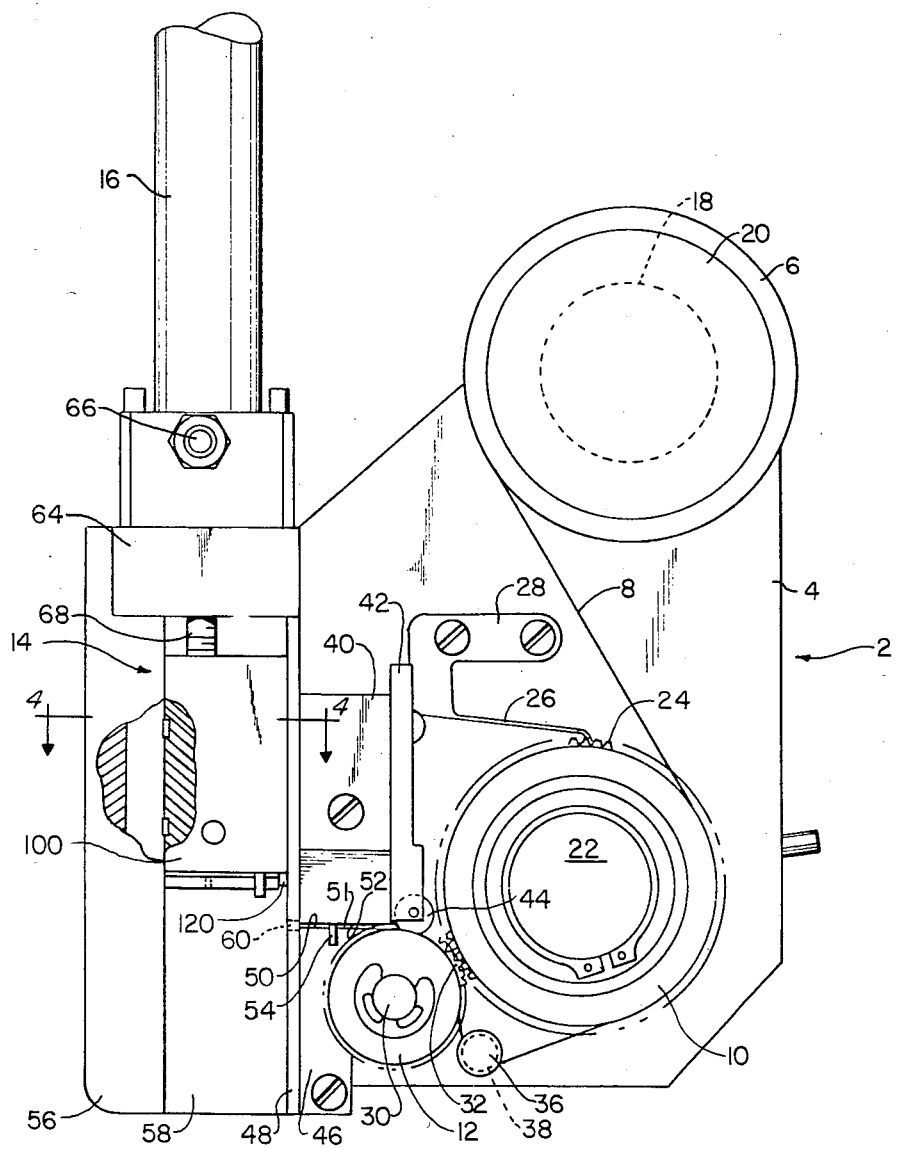
FIG. 1 is a partial front view with portions broken away of a splicing tape dispenser-applicator which incorporates a novel plunger assembly constructed in accordance with the present invention.
Figure 2:
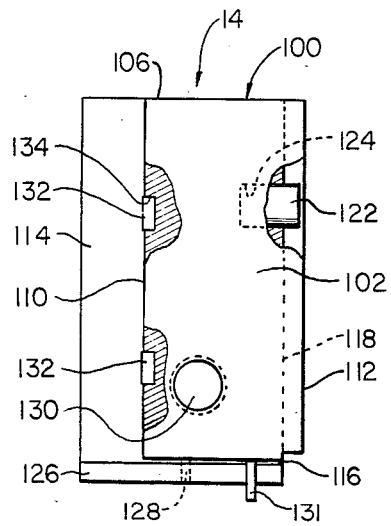
FIG. 2 is an enlarged front view with portions broken away of the plunger assembly shown in FIG. 1.
Figure 3:
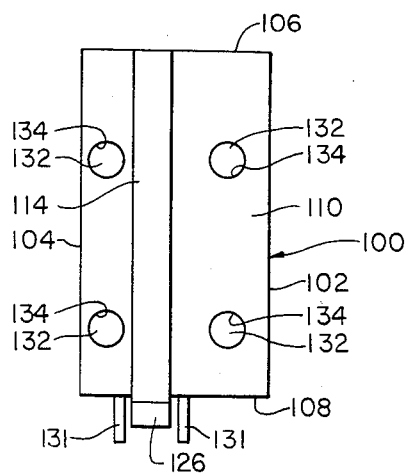
FIG. 3 is a side view of the plunger assembly shown in FIG. 2.

Turning first to FIG. 1, there is shown a splicing tape dispenser-applicator 2 which incorporates the preferred form of the novel plunger assembly. With the exception of the novel plunger assembly incorporated therein, splicing tape dispenser-applicator 2 is substantially the same as the splicing tape dispenser-applicator described and illustrated in U.S. Pat. No. 3,753,835. Therefore, for the sake of brevity, those portions of the splicing tape dispenser-applicator shown in FIG. 1 which are common to the splicing tape dispenser-applicator described and illustrated in U.S. Pat. No. 3,753,835 are dealt with herein only in such detail as is necessary to understand the present invention. Reference should be made directly to U.S. Pat. No. 3,753,835 for more detailed description on such common portions should the same be desired.

Splicing tape dispenser-applicator 2 generally comprises a carriage plate 4 on which is mounted a supply reel 6 of a splicing tape 8 which is coated on one side with a pressure-sensitive adhesive in order that it may serve to splice two subject tapes as hereinafter described. Also mounted to carriage plate 4 is a splicing tape feed wheel 10, a smaller tape feed wheel 12, a plunger assembly 41 which comprises the preferred embodiment of the present invention, and a double-acting fluid actuator 16.

Splicing tape supply reel 6 is rotatably mounted on a hub 18 which is affixed to and projects at a right angle from the plane of plate 4. Reel 6 is held in place on hub 18 by suitable means, e.g. a plastic cap 20 which is adapted to slip over and make a friction fit with the free end of hub 18. Splicing tape supply reel 6 is positioned on hub 18 so as to be in planar alignment with feed wheel 10 and feed roll 12, as will hereinafter be described in further detail.

Feed wheel 10 is mounted to a shaft 22 which extends through carriage plate 4 and forms part of a suitable one-way clutch mechanism (not shown). This clutch mechanism is adapted so that (1) when shaft 22 rotates in a clockwise direction (as seen from the viewpoint of FIG. 1), feed wheel 10 will also rotate in a clockwise direction, and (2) when shaft 22 rotates in a counter-clockwise direction, feed wheel 10 will not rotate at all.

A spur gear 24 is disposed on shaft 22 between feed wheel 10 and carriage plate 4. Gear 24 is coupled to shaft 22 by means of the aforementioned clutch mechanism, and is securely attached to feed wheel 10, so that the spur gear and the feed wheel rotate as a single unit. Spur gear 24 contacts a finger 26 of a spring latch 28 mounted to carriage plate 4. This contact assures that spur gear 24 (and hence feed roll 10) can only rotate in a clockwise direction about shaft 22.

Splicing tape feed wheel 10 is provided with a circumferential groove in its periphery that is just wider than the width of the splicing tape 8, in order that the groove may serve as a seat for the splicing tape on the feed wheel. Wheel 10 is disposed on shaft 22 so that the wheel's peripheral groove sits in planar alignment with splicing tape supply reel 6. As a result, splicing tape 8 may be passed from supply reel 6 to the peripheral groove of feed wheel 10 without causing any deformation of the splicing tape.

Also affixed to carriage plate 4 is a short stub shaft 30. Splicing tape feed roll 12 is rotatably mounted on stub shaft 30, as is a second smaller spur gear 32. Gear 32 is securely connected to roll 12 so that the two members rotate on shaft 30 as a single unit. Feed roll 12 is provided with a circumferential groove in its periphery that is just wider than the width of the splicing tape 8, in order that the roll's peripheral groove may serve as a seat for the splicing tape on the feed roll. Feed roll 12 is mounted so that its peripheral groove sits in planar alignment with the peripheral groove of feed wheel 10 and also with tape supply reel 6. As a result, splicing tape 8 may be passed from the peripheral groove of feed wheel 10 to the peripheral groove of feed roll 12 without causing any deformation of the splicing tape.

Spur gear 32 meshes with the spur gear 24 disposed on the adjacent feed wheel 10. As a result, whenever feed wheel 10 moves in a clockwise direction, feed roll 12 will move in a counterclockwise direction, and whenever feed wheel 10 remains stationary (on account of its engagement with finger 26 of spring latch 28), feed roll 12 will also remain stationary.

A tape guide pin 36 is also affixed to carriage plate 4 below feed roll 12. Guide pin 36 has a peripheral groove 38 which has the same width as, and is in planar alignment with, the peripheral grooves in feed wheel 10 and feed roll 12.

A small block 40 is mounted to carriage plate 4 above stub shaft 30. Attached to block 40 is a plate 42 carrying a rubber pressure roller 44 on its bottom end. Plate 42 is positioned so that pressure roller 44 can ride within the peripheral groove of feed roll 12 and thereby serve to retain splicing tape in the peripheral groove in feed roll 12.

Also mounted to carriage plate 4 is a tape picker 46. Tape picker 46 is located between feed roll 12 and a vertical member 48 which defines one side of the plunger guide channel 58 and is formed with a flat surface 50 on its upper end. Picker 46 has a thickness slightly less than the width of the peripheral groove in feed roll 12, and is positioned so that it extends into that groove and its upper surface 50 lies tangent to the groove. A small horizontal gap 51 exists between the top surface 50 of picker 46 and the bottom surface 52 of block 40. As a result, a length of splicing tape winding around feed roll 12 will be lifted from the peripheral groove of that roll by picker 46 and guided into horizontal gap 51 towards vertical member 48. A pair of spaced guide pins 54 (only one of which is shown) on the bottom surface of block 40 serve to constrain splicing tape travelling in gap 51 against sideways travel. When dispenser-applicator 2 is mounted to a tape winding machine, a rotatable operating mechanism (not shown) is provided for rotating shaft 22 clockwise on command through a selected angle so as to advance a predetermined length of splicing tape into the channel 58 hereinafter described.

Also attached to carriage plate 4 are a pair of parallel plunger guide members 48 and 56 which are made of metal and define a vertical channel 58 for plunger assembly 14. Vertical member 48 has a horizontal slit 60 for admitting splicing tape travelling along the horizontal gap 51 into channel 58. Member 56 is formed with a vertically extending slot 62 (FIG. 4) for guiding plunger 100.

Vertical members 48 and 56 are connected at their top ends by a horizontally-extending block 64 which serves as a mount for double-acting fluid actuator 16. Actuator 16 is provided with hose fittings 66 (only one of which is shown) on its opposite ends for admitting air into the actuator. The actuator's piston rod 68 extends through an oversized bore (not shown) in block 64 down into channel 58 and its free end is affixed to plunger assembly 14.

Looking now at FIGS. 1–4, plunger assembly 14 comprises a metal plunger 100 having a front surface 102, a rear surface 104, a top surface 106, a bottom surface 108, and opposite side surfaces 110 and 112. A rib 114 projects from side surface 110, and a rib 116 projects from bottom surface 108.

Figure 4:
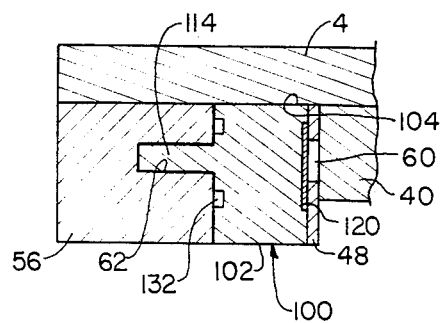
FIG. 4 is a partial sectional view taken along line 4—4 of FIG. 1.

Plunger 100 has a vertically extending slot 118 in its side surface 112 to accommodate a cutter member 120 (FIGS. 1 and 4). Cutter member 120 is disposed in slot 118 so that its outermost surface lies in planar alignment with side surface 112. Cutter member 120 is fastened to plunger 100 by means of a threaded fastener 122 which is received in a threaded bore 124 in plunger 100.

A plunger pad 126 is disposed on the bottom side of rib 116. Plunger pad 126 is coextensive with rib 116 and lies adjacent to the bottom end of cutter member 120 where it protrudes from slot 118. Plunger pad 126 is formed of a resilient material e.g. a soft rubber, and has one or more apertures 128 which communicate through a hole (not shown) in the bottom surface of plunger 100 with a chamber (not shown) formed in the interior of plunger 100 and having a vacuum opening 130 in front surface 102. A vacuum may be supplied to the bottom side of plunger pad 126. In practice, plunger opening 130 is connected by a hose (not shown) to a source of vacuum via a suitable control valve (not shown). Vacuum is applied to the plunger while the plunger is moving down in channel 58 and is removed when the plunger reaches the end of its downward stroke.

Rib 116 and plunger pad 126 are sized so that they have a width which is approximately the same as the width of splicing tape 8. A pair of guide pins 131 extend out of bottom surface 108 on either side of bottom rib 116 and plunger pad 126. Guide pins 131 extend slightly below the bottom surface of plunger pad 126.

In accordance with this invention, plunger 100 carries a plurality of low-friction bearing devices thereon. These bearing devices are in the form of cylindrical pads 132 which are disposed in bores 134 formed in side surface 110. Pads 132 extend out of bores 134 slightly beyond the plane of side surface 110, and are preferably bevelled into a rounded dome shape on their projecting ends. Pads 132 are formed from a relatively hard, low-friction material, e.g., Delrin ®. Other low-friction plastic materials also may be used. While pads 132 are relatively hard, they are less hard than the metal of which the plunger and guide members 48 and 56 are made. The pads are sufficiently hard to keep the plunger from engaging the adjacent guide member or at least limit the engagement to a low pressure contact.

Plunger assembly 14 is disposed in channel 58, so that side surface 112 and cutter member 120 make a close sliding fit with guide member 48, rear surface 104 makes a close sliding fit with carriage plate 4, cylindrical pads 132 make a close sliding fit with guide member 56, and side rib 114 extends into and makes a close sliding fit with the portions of guide 56 which define vertical slot 62. At the same time, because cylindrical pads 132 project from the surface 110 of plunger 110, surface 110 of the plunger member makes a minimal, if any, contact with vertical member 56.

Plunger assembly 14 is reciprocated in channel 58 by actuator 16. Actuator 16, plunger assembly 14, and other parts of the splicing tape dispenser-applicator are sized and positioned relative to one another so that (a) when piston rod 68 is fully retracted, plunger assembly 14 is disposed in an upper position (FIG. 1) enabling splicing tape to enter channel 58 from horizontal gap 51 via slot 60 and to pass just below plunger pad 126 between guide pins 131, and (b) when piston rod 68 is fully extended plunger assembly 14 will be disposed so that plunger pad 126 will be located below the bottom end of channel 58.

When actuator 16 is stimulated so as to cause plunger assembly 15 to move downward in channel 58, the cutter member 120 will sever the splicing tape located below the plunger by a shearing action at the point where the tape comes through the slit 60 in vertical member 48. The severed portion of splicing tape 8, kept against pad 126 by the suction applied via aperture 128 for substantially the full down stroke of the plunger, is driven downwardly by the plunger assembly 14 into tight engagement with the abutting ends of the tapes being spliced, whereby the pressure-sensitive adhesive coating on splicing tape 8 causes the splicing tape to be attached to the two tapes. As or immediately after the splicing tape engages the tapes to be spliced, the vacuum force is removed from the plunger so as to release the splicing tape from pad 126. Thereafter, actuator 16 is caused to raise plunger assembly 14 back to its top at rest position in channel 58. The severed splicing tape remains in contact with the spliced tapes as plunger assembly 14 moves upwardly again to its original position. As the plunger 14 moves upwardly again, or after it has returned to its original elevated position, the associated mechanism on the tape winding machine causes shaft 22 to rotate again in a clockwise direction so as to advance an additional length of splicing tape 8 into channel 58 between vertical members 48 and 56 in anticipation of the next cycle of operation of the splicing tape dispenser-applicator 2 as above described.

ADVANTAGES OF THE PRESENT INVENTION

A splicing tape dispenser-applicator incorporating the present invention is far superior to a dispenser-applicator like the one described and illustrated in U.S. Pat. No. 3,753,835 since the novel low-friction bearing devices on the plunger reduce the wear which occurs between the plunger and the parts which define the plunger's guide channel. These low-friction devices carry the bearing load between the plunger and the adjacent channel-defining member. Since they protrude from the plunger, they prevent the plunger from engaging the adjacent guide member and thus reduce plunger wear and also wear of the adjacent guide member. Having at least two pads and spacing them apart facilitates guidance of the plunger and helps control the amount of friction since each pad may be relatively small. The lower the friction the faster the plunger may be reciprocated. As a result, maintenance and replacement costs are significantly reduced.

MODIFICATIONS OF THE PREFERRED EMBODIMENT

It is envisioned that one might modify the preferred embodiment of the present invention without departing from the scope of the present invention.

Thus, for example, the number and location of the low-friction bearing devices may be varied. Also low-friction bearing devices may be disposed on surfaces other than, or in addition to, surface 110. More particularly, one might provide bearing devices on side surface 112 of plunger 100 for sliding engagement with guide member 48 as the plunger reciprocates within its vertical channel.

Also it is possible to have bearing devices disposed in side rib 114 so as to bear against those portions of vertical member 56 which define vertical slot 62. The shape or form of the low-friction bearing devices also may be varied.

The present invention also may be utilized in other forms of splicer mechanisms which utilize a plunger mounted for reciprocating movement in a guide channel.

Still other changes within the scope of the present invention will be obvious to persons skilled in the art.

What I claim is:

1. In a splicing tape dispenser-applicator of the type comprising:
   (a) at least one member defining a guide channel;
   (b) a plunger assembly mounted for reciprocating movement lengthwise within said channel; and
   (c) tape feed means for feeding splicing tape into said channel upon command, in order that a length of splicing tape fed into said channel by said tape feed means may be severed and applied by said plunger assembly to adjoining lengths of tape to be spliced when said plunger is reciprocated within said channel, the improvement wherein:

said plunger assembly comprises a plunger and at least one elongate low-friction bearing device carried by said plunger and disposed so as to engage said at least one member and thereby lessen the friction between said plunger and said at least one member when said plunger assembly is reciprocated longitudinally within said channel, and further wherein said at least one low-friction bearing device is disposed in and protrudes from a bore formed in said plunger and extending at a right angle to said at least one member and the path of reciprocal movement of said plunger within said channel.

2. A plunger assembly according to claim 1 having at least two low-friction bearing devices disposed in and protruding from bores formed in said plunger member, both of said bores extending at a right angle to said at least one member and the path of reciprocal movement of said plunger within said channel, and said low-friction bearing devices comprising cylinders of a relatively hard, low-friction material.

3. A plunger assembly according to claim 2 wherein said at least one member is made of metal and said low-friction bearing devices have rounded ends protruding from said plunger.

4. A plunger assembly according to claim 3 wherein said low-friction bearing devices are formed out of Delrin ®.

5. In a splicing tape dispenser-applicator of the type comprising:
 (a) at least one metal member defining a guide channel;
 (b) a plunger assembly mounted for reciprocating movement lengthwise within said channel; and
 (c) tape feed means for feeding splicing tape into said channel upon command, in order that a length of splicing tape fed into said channel by said tape feed means may be severed and applied by said plunger assembly to adjoining lengths of tape to be spliced when said plunger is reciprocated within said channel, the improvement wherein:
said plunger assembly comprises a metal plunger and at least two low-friction bearing devices carried by said plunger and disposed so as to engage said at least one member and thereby lessen the friction between said plunger and said at least one member when said plunger assembly is reciprocated longitudinally within said channel, said at least two low-friction bearing devices comprising pads of relatively hard, low-friction plastic material disposed in and protruding from bores formed in said plunger, said bores extending at right angles to the path of movement of said plunger in said channel, and said pads having rounded surfaces at one end engaging said at least one metal member.

* * * * *